Nov. 30, 1971 M. SCIAKY ET AL 3,623,214
FRICTION WELDING MACHINE AND PROCESS
Filed Jan. 29, 1969 3 Sheets-Sheet 1

INVENTORS.
MARIO SCIAKY
EMMANUEL JULIEN THIRION
BY

INVENTORS.
MARIO SCIAKY
EMMANUEL JULIEN THIRION

United States Patent Office 3,623,214
Patented Nov. 30, 1971

3,623,214
FRICTION WELDING MACHINE AND PROCESS
Mario Sciaky, St.-Cloud, and Emmanuel L. Thirion, Paris, France, assignors to Welding Research, Inc., Chicago, Ill.
Filed Jan. 29, 1969, Ser. No. 794,872
Claims priority, application France, Apr. 5, 1968, 147,227
Int. Cl. B23k 27/00
U.S. Cl. 29—470.3     10 Claims

ABSTRACT OF THE DISCLOSURE

The disclosure concerns a method of friction welding in which the power absorbed by the parts rubbing one against the other is caused to follow a preset program of power. The absorbed power is measured continuously by measuring separately the friction couple and the angular velocity of the work piece which is rotating and forced against the stationary work piece. The absorbed power is then compared to a preset power program and the difference or error between the two is fed to a servo amplifier and operator which functions to cause the absorbed power to follow the preset power program.

Should the error exceed a preset value a signalling device is energized to alert the machine operator.

---

Friction welding machines in which heat is produced by rubbing one part upon one or more other parts to be welded to it are known in the art.

The production of such heat depends on the energy absorbed by the two parts in friction and is equal to the product of the friction couple of the two parts by the angular speed of the part driven into rotation and by the duration of the heating operation.

In the known machine, however, it is not possible to have an accurate control of these parameters, and therefore the welds produced do not always have the same characteristics.

Recent modifications to these machines did not solve this problem entirely. In particular, a flywheel of high inertia was provided and the energy stored in the rotating flywheel was transformed into heat for the welding of the parts. However, although the available energy is always the same in such a machine for a particular speed, if the friction couple varies, the duration of the operation varies also and the quantity of energy required in order to make the weld is different from that provided originally, because of the variation in heat losses.

Also various means were provided to measure the friction couple and to keep it to a preset value.

However, in this case also, if an unexpected variation of the speed occurs, caused, for example, by an accidental braking in the transmission of the motion, the power absorbed is different, and, although the duration of the operation is constant, the weld may not exhibit the required quality.

The object of the present invention is to remedy these disadvantages; to this effect it covers a friction welding process for applying the two parts to be welded against one another under the action of an axial force, for driving into rotation one of the parts to be welded under the action of a motor, and for generating in this way a power equal to the product of the couple by the angular speed. The absorbed energy which is transformed into heat energy is then equal to the integral of this power with respect to the time of heating of the parts. The process is characterized in that at each instant the absorbed power for heating of the parts to be welded is regulated by a predetermined power. By measuring separately the friction couple and the relative angular speed of the parts to be welded, one can obtain, in a simple and automatic manner, welds of reproducible quality.

According to another characteristic of the invention, the predetermined values, regulating on one hand the friction couple and on the other hand the angular speed, are fixed during the welding operation.

According to another characteristic of the invention, the predetermined values, regulating on one hand the friction couple and on the other hand the angular speed, are variable during the welding operation and are established by programming means.

According to another characteristic of the invention, the actual value of two of the three parameters, couple, speed and power, are measured, and the valve of the third parameter is determined by making a multiplication or division electronically of the two measured parameters. One then compares the value of the third parameter derived from the measured parameters to the preset value for this third parameter.

The invention also covers the machines to carry out the present process or similar process.

A process in conformity with the invention is illustrated, as a non-limitative example, on the enclosed drawings in which.

The purpose of the present invention is to control, during the entire welding operation, the parameters which intervene during this operation. For example, the friction couple and the angular speed whose values can be either constant or variable, may be determined by any programming. The invention will then permit to reproduce welds of similar characteristics.

However, although these values can be corrected by servo-mechanisms, it can happen, due to incidents modifying the effects of the parameters on the parts in friction or, if limit values have been reached, that the desired values cannot be obtained.

According to the invention, this condition is then signaled by the continuous measurement of the power obtained from the product of the friction couple measured and the angular speed measured. By comparing the power so measured to the preset power, one obtains an error and, by comparing this error to a reference value or a predetermined tolerance, it is possible to initiate an aural or optical warning means if this error becomes higher than this tolerance.

Figure 1:
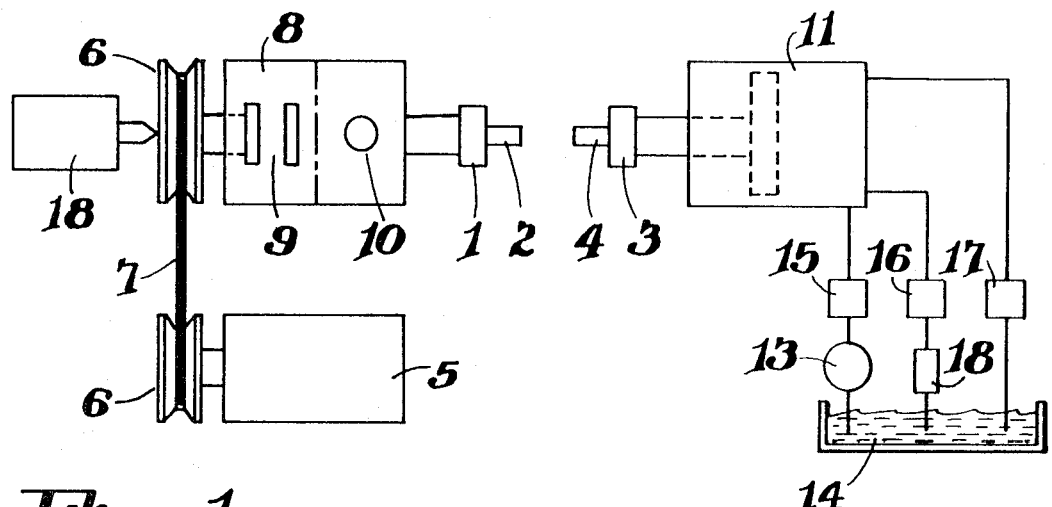
FIG. 1 represents, schematically, a friction welding machine.

Friction welding machines are essentially made (see FIG. 1) of a mandrel 1, driven into rotation and supporting one of the parts to be welded 2, as well as a mandrel 3, capable of moving axially and supporting the other part to be welded 4.

The rotating mandrel 1 is driven into rotation by any motor arrangement 5, such as an electric motor, hydraulic, pneumatic, or other, which is connected by any transmission, for example pulleys 6 and belt 7, to a driving apparatus 8 consisting of a clutch 9 by which the rotating mandrel 1 is driven, and a brake 10 to stop the rotation of this mandrel and therefore of the part to be welded 2.

Also, a jack 11 is provided to act upon the mandrel 3. This jack 11 applies an axial force which determines the friction couple between the work pieces 2 and 4. This jack 11 can be either pneumatic or hydraulic and, in the second case, a pump 13 is provided to bring the liquid from the tank 14 into this jack through servo valve 15; this servo valve 15 is to control the pressure of the fluid in order to regulate the force between parts 2 and 4 and thus to regulate the friction couple.

When, through friction, parts 2 and 4 are brought to a high enough temperature, the clutch 9 is opened, the jack 11 is fed from pump 13 through the valve 16 which determines the forging force for parts 2 and 4, the brake 10 is applied and the two parts 2 and 4, which are now welded, are stopped.

The fluid is returned to the tank from jack 11 by the return valve 17, while valve 18 is also provided to constitute the return circuit of pump 13.

In this machine, the angular speed of part 2 is measured by a tachometer generator 18; the measurement of the friction couple can be obtained by means of a sensing device arranged on the fixed mandrel 3.

Alternately it is possible to obtain a measurement of the friction couple by measuring, on motor 5, a voltage proportional to the motor couple. To this value it is sufficient then to add a term $jdw/dt$ resulting from the variation of the angular speed.

The voltage proportional to the motor couple can be obtained by the measurement of the rotation angle of the stator of motor 5 which may be mounted in such a way as to be able to turn at an angle proportional to the couple it develops.

When one uses a direct current motor, a value proportional to the couple of the motor can be obtained by measuring the armature current of this motor.

Also, in the case where a hydraulic motor is used, the motor couple is proportional to the pressure of the fluid, and it is therefore possible to obtain a value proportional to this couple by measuring the pressure with a pressure sensing device.

The term $jdw/dt$ can, on the other hand, be obtained by taking the derivative of the voltage supplied by the tachometer generator 18.

Through a selection of scales, one can obtain the measurement of this friction couple by adding the two voltages supplied by the indicated measurements.

Another element which must be controlled is the servo valve which is placed between the pump 13 and the jack, and which is subjected to the voltage error of the friction couple; this error voltage will be the voltage obtained by opposing a preset value of the friction couple to the value which is obtained by the methods indicated above. This servo valve 15 operates progressively and feeds jack 11 in such a manner as to exert on the parts a force such that the friction couple follows the preset value.

Concerning the regulation of the speed, when one uses a DC current motor, it is fed by a controlled rectifier with which is becomes possible to control the speed with a high precision by bringing into play, at the input of an amplifier, the error voltage. If the variations in speed are rather slow so that the couple furnished by the motor is always positive, the rectifier is unidirectional. On the other hand, if the variations in speed are faster and such that the couple required to be supplied by the motor can become negative, it is necessary that a second rectifier be supplied.

In the case where motor 5 is a hydraulic motor it is necessary to furnish control valves permitting a functioning identical to that with an electric motor.

As indicated previously, and according to the invention, it is planned to preset parameters such that the couple and the speed and the setting of each of these parameters are, preferably, in the form of a voltage proportional to the value that one desires to obtain. This value is treated as a voltage which is then compared to the voltage resulting from the actual measurement of the corresponding parameter, so that the differences results in an error voltage permitting the correction.

However, this preset voltage can be fixed, and this is the case for the speed of a motor which must be maintained constant, but it can also be varied and the variation is then done according to a desired pattern.

More often this variation is required according to a function $u=f(t)$ which starts at the beginning of the welding operation, the duration of the period of heating resulting from the friction being determined by a timer which is initiated at the start of the welding operation, i.e., at the instant when the parts to be welded come in contact with each other.

When this timer has determined the end of the heating operation, it releases the clutch to remove the connection with motor 5 while brake 10 is brought into action.

At the same time, the servo valve producing the forging force is energized.

Figure 2:
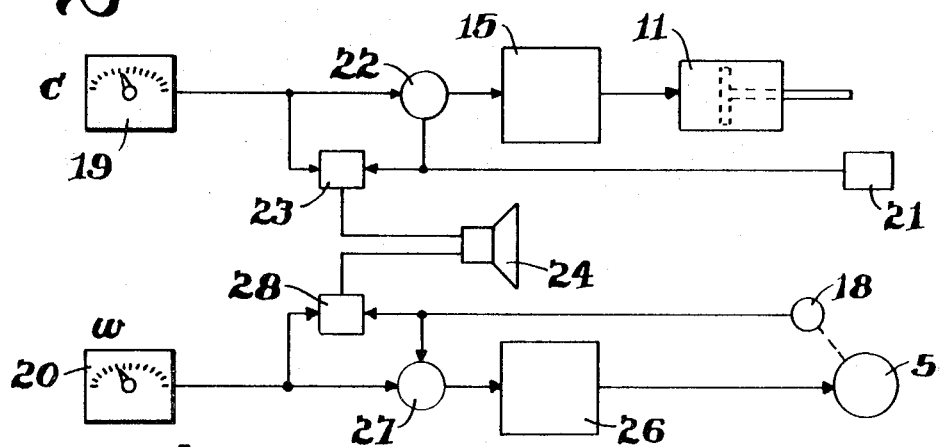
FIG. 2 represents, as a synoptical sketch, a first mode for carrying out the invention, in which the friction couple and the rotation speed remain constant during the welding operation.

The example for carrying out the invention as represented on FIG. 2, represents synoptically the setup of a friction welding machine in which the values of couple C and angular speed $w$ are determined, respectively, by the potentiometers 19 and 20, these values remaining constant during the entire welding operation.

This arrangement includes two servo systems which maintain constant the values of the friction couple and the angular speed.

The true friction couple is measured by step 21 as described above, either by sensing device, or by a step producing the sum of the motor couple and the term $jdw/dt$.

This value of the measured couple is then compared, at step 22, with the value of couple as preset by the potentiometer 19 in order to control through an amplifier (not shown) the servo valve 15 placed between pump 13 and jack 11.

Also the value of the friction couple measured by 21 and the value of the couple preset by 19 are compared in step 23 to determine an error voltage which is opposed to a reference value constituting the tolerance so that a signal device 24 is energized if the error becomes greater than the reference value.

The method of control of the speed is also shown on FIG. 2. The DC current motor 5 is fed by a controlled rectifier 26 with simple or double conduction, and the voltage analog of the speed derived from the tachometer generator 18 is compared in step 27 to the corresponding voltage as preset by potentiometer 20.

The error voltage which results in amplified by an amplifier (not shown) which acts upon the controlled rectifier 26 to control the rotation speed of the motor.

The voltage analog of the true speed of the motor, derived from generator 18, is compared in step 28 to the preset value for the desired speed. The error which results is then opposed in this step 28 to a reference value in order to energize the alarm 24 as soon as this error exceeds the reference value or tolerance.

Figure 4:
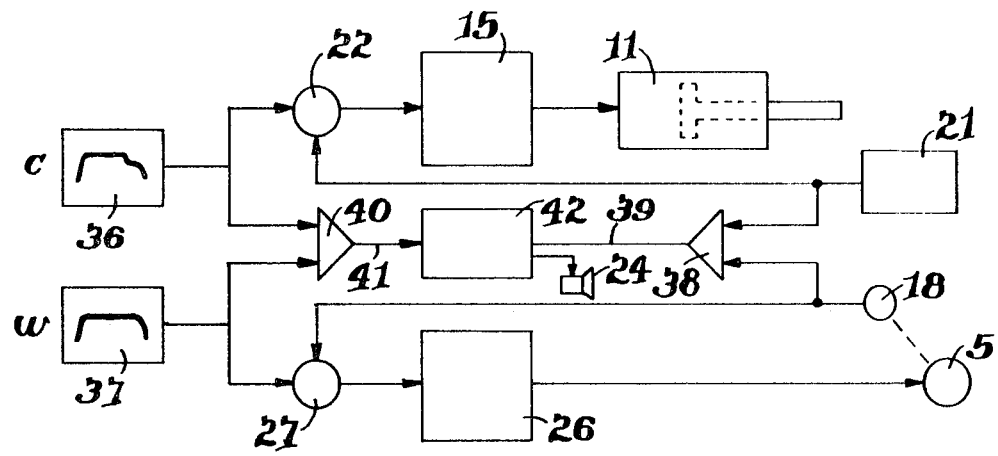
FIG. 4 represents the synoptic sketch of a mode for carrying out the invention, in which the couple and the angular speed are preset.
Figure 5:
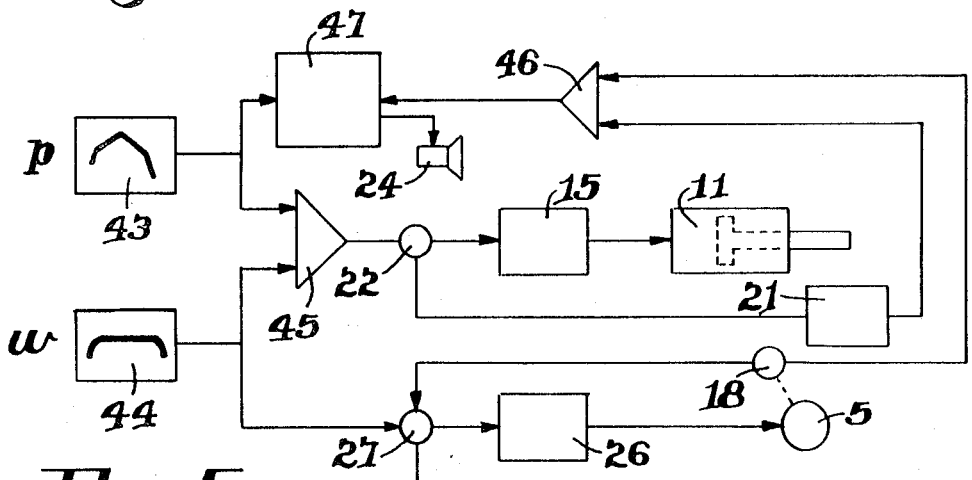
FIG. 5 represents the synoptic sketch of a mode for carrying out the invention, in which the power and the angular speed are preset.
Figure 6:
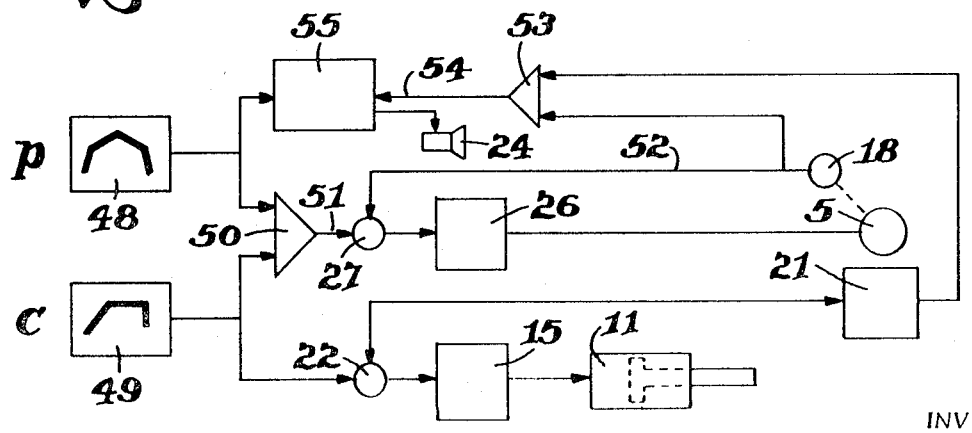
FIG. 6 represents the synoptic sketch of a mode for carrying out the invention in which the power and the friction couple are preset.

The arrangement of welding machine represented on FIGS. 4 to 6 corresponds to machines in which the parameters can vary during the welding operation.

In this case, the value of the parameters are preset on a programming device according to any law in function of time.

Figure 3:
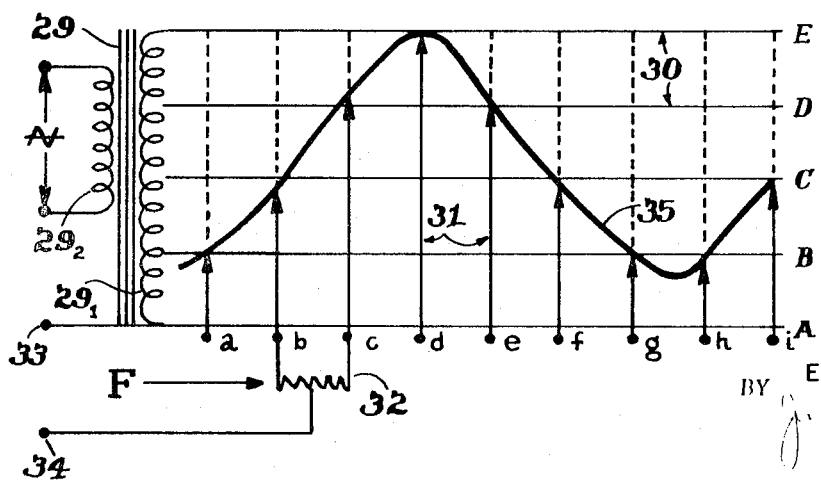
FIG. 3 represents, schematically, a system for presetting one of the parameters of the welding operation.

An example of programming device is given on FIG. 3 in which the secondary $29_1$ of transformer 29 is connected to horizontal bars 30. The primary $29_2$ of this transformer is fed from the power line. Terminals marked from $a$ to $i$ are, in addition, connected to vertical sliding switches 31. By means of a switch 32 is is possible to make a connection from a pair of adjacent terminals from $a$ to $i$ to a pair of bars 30 from A to E, through the vertical sliding switches 31.

Under the action of a motor (not shown) whose speed is adjustable, the sliding fingers of switch 32 are displaced in the direction of arrow F. These sliding fingers enter successively, at intervals of equal times, in contact with terminals from $a$ to $i$ so that one gathers, between the terminals 33 and 34, a voltage variable in function of the time, which is determined at each instance by the connection of the different vertical switches with the horizontal bars.

In order to obtain a voltage at the exit varying progressively, a device is provided which permits an interpolation of the voltage between any two adjacent terminals from $a$ to $i$.

This programming device permits, therefore, to build a curve, such as 35 representing the variations of voltage required, as a function of time, during the welding operation. This voltage is initiated at the moment when the motor which controls the displacement of sliding fingers 32 is caused to rotate.

On the other hand, it is understood that FIG. 3 is purely schematic and a good definition of the curve can, for example, be obtained with 100 horizontal bars and a suitable number of terminals connected each to a vertical switch.

It will be noted also that the connections between the horizontal bars 30 and the vertical sliding switches 31 connected to terminals from $a$ to $i$, instead of being done by sliding switches can be made by contacts actuated by a perforated card. By introducing this perforated card in a commutation block the contacts can be established at determined times defining the planned programming.

With such device, one does not have to fear any error on the part of the operator, and the tracing of the curve which is visible with sliding switches can be replaced by a diagram drawn on the card.

Another solution is to utilize a perforated tape driven by a motor whose speed can be controlled. This tape will determine the programming and insure at the same time the commutation in time, which is similar to the commutation of sliding switch 32 across terminals $a$ to $i$.

In this manner one will achieve programming by numerical control.

Also, in this case, the interpolation of the successive values can be achieved by reading simultaneously several lines in order that, with a certain shifting, one can then obtain a continuity in the voltage which reproduces faithfully the desired programming.

From that starting point, all the known devices for the numerical control are usable and, in particular, the printing on magnetic tape.

The installations which will be described below in the light of FIGS. 5 and 6 comprise each two presetting panels permitting to define two parameters, the third parameter being defined by an analogical operation of multiplication or division.

In the application for carrying out the invention as shown on FIG. 4, the presetting panels 36 and 37 have the function of programming the values of the friction couple C of the two parts with respect to time and the angular speed $w$ of the part driven into rotation.

Furthermore, the true values of the couple and the speed are measured in the manner described above by step 21 and by the generator 18 respectively. The actual value of the couple is compared at step 22 to the preset value in order to control the servo valve 15 and therefore the jack 11, and determine in this way, at each instant, the friction force.

Also, the analog of the angular speed measured and derived from the tachometer generator 18 is compared at step 27 to the preset value for the angular speed in order to control the controlled rectifier 26 which determines the speed of rotation of motor 5. In addition to the two loops of control of the friction couple and the angular speed, the two values measured of the couple and the angular speed are fed to an analog multiplying device 38 at the output of which one obtains, on line 39, a value which is a function of the power.

Also, the preset values of the couple and the angular speed derived from the presetting panels 36 and 37 are fed to a multiplier 40 at the output of which is found, on line 41, a value which is a function of the power called "preset power." These two values, measured power of line 39 and "preset power" of line 40, are fed to a comparison step 42, and their difference is compared to a preset reference or tolerance value. In case the difference between the preset power and the measured power exceeds this tolerance, an audio or optical signal 24 is energized for a warning.

Figure 7:
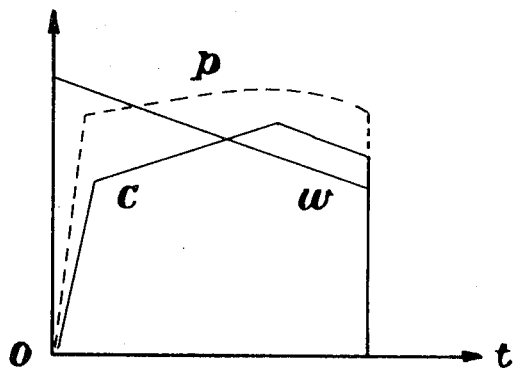
FIGS. 7, 8, 9 are diagrams showing the variation of the three parameters, power, couple and angular speed, and corresponding respectively to FIGS. 4, 5 and 6.

FIG. 7 represents the graph of an example of functioning of a welding machine in accordance with FIG. 4. The values of the couple C and the angular speed $w$ as a function of time are shown by solid lines. The product of the instantaneous values of couple C and angular speed $w$, which gives the instantaneous value of power, is represented by a dotted line.

On this diagram the speed $w$ decreases with respect to time so that a couple proportional to the moment of inertia of the parts and the time derivative of the speed, is produced, which is added to the couple supplied by the motor. This diagram shows also that the friction couple increases from the value 0 to its maximal value, so that one avoids abnormal stresses at the beginning of the operation, when the parts do not completely bear on each other.

In the application for carrying out the invention as shown on FIG. 5, the presetting panels 43 and 44 are used, respectively, to program the power and the angular speed, while the stages 21 and 18 measure respectively the actual values of the friction couple and the angular speed.

The measured value of the couple derived from stage 21 is then compared in stage 22 to the preset value of the couple appearing at the output of the analog divider 45 resulting from the division of the preset values of power and angular speed, as obtained from stages 43 and 44.

Step 22 then controls, as previously, the servo valve 13 and therefore the hydraulic jack 11.

The control of the angular speed is obtained by direct comparison, at stage 27, of the actual value measured by the tachometer 18 and the preset value as obtained from stage 44.

The comparison step 27 can then control the controlled rectifier 26 and the motor 5, as previously indicated.

In addition to these two controls of the couple and the speed, the measured values of the couple and the speed are fed to an analog multiplier 46 whose output is a function of the measured power. This measured power is then compared in comparison stage 47 to the preset power as obtained from panel 43 so that the difference is compared to a constant reference value which is the tolerance and which controls signal device 24 whenever the difference between the preset and measured powers exceeds this tolerance value.

Figure 8:
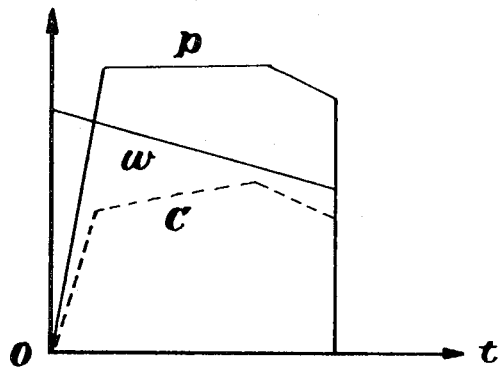

FIG. 8 represents, as an example, a cycle of operation of a machine in accordance with FIG. 5.

In FIG. 8, the preset values of the power and the angular speed w are represented by a solid line, while the value of couple C resulting from the division of these two preset values of power and angular speed is represented by a dotted line.

According to this figure also one can see that the speed decreases from an initial time and that the friction couple C increases from 0 to its maximum value at the beginning of the operation.

In the application for carrying out the invention as shown in FIG. 6, the presetting panels 48 and 49 are used respectively to program the power and the couple.

Furthermore, stage 21 and tachometer 18 measure respectively the actual values of angular speed and friction couple.

The measured value of the couple derived from stage 21 is compared at stage 22 to the preset value of the couple as obtained from panel 49, in order to control the servo valve 15 and therefore hydraulic jack 11, so that the friction couple of the two parts to be welded is controlled at the value indicated by the preset panel 49.

Also, the preset values of the power and couple as obtained, respectively, from panels 48 and 49 are brought into the analog divider 50 so that one obtains at 51 a value which is a function of the preset angular speed.

This preset value appearing at 51 is then compared at stage 27 to the measured value of the angular speed appearing at 52 in order to control the controlled rectifier 26 and command, in this way, the rotation speed of the motor 5 to the desired speed which results from the division of the preset power by the preset couple.

The measured values of the couple and the speed are also fed to a multiplier 53 in order to obtain at 54 a value which is a function of the measured power. This value is then compared in stage 55 to the preset value obtained from panel 40 in order that the error resulting from this comparison can be compared to a reference value which constitutes the tolerance.

If the difference between the values of the preset power and the measured power is greater than this tolerance, comparison stage 55 then controls a signal device 24.

Figure 9:
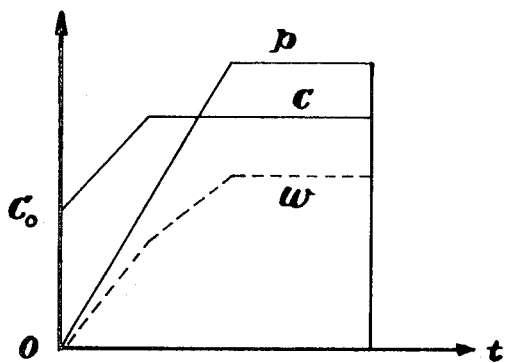

FIG. 9 shows, as an example, a cycle of a machine in accordance with FIG. 6.

On this diagram it has been supposed that, in order to make a special weld, it is necessary to first put the parts in contact. At the initial time the speed is therefore zero and the friction couple value is $C_0$.

According to this diagram, the angular speed w is determined, as has been described, by the division of the two preset values of the power and friction couple in order to compare it to the measured value of angular speed.

The invention is not limited to the examples of application above described and represented since they may be used to conceive other forms and other applications which would not depart from the scope of the invention.

What we claim is:

1. In a friction welding process the steps of; clamping one of the parts to be welded in a mandrel which may be driven into rotation about its axis, clamping a second part in a non-rotating mandrel so arranged that it may be moved along the said axis, driving into rotation the aforesaid first part, bringing the two parts into contact and applying an axial force between the two parts, measuring the power absorbed by the parts to be welded, comparing the instantaneous values of absorbed power with a preset program of power with respect to time, applying the difference between the aforesaid instantaneous absorbed power and power program to a servo controller which acts to maintain the difference between the two powers at a preset tolerance.

2. A method of friction welding as in claim 1 in which the absorbed power is measured by measuring the friction couple and the angular relative speed between the parts being welded and multiplying the voltage analog of the said friction couple by the voltage analog of the said speed.

3. A method as in claim 2 in which the said servo control acts on a jack which establishes the contact and force between the parts to be welded.

4. A method as in claim 3 in which the angular speed and the friction couple are controlled by servo loops so as to cause the motor speed to follow a preset program of speed versus time and the friction couple to follow a program of couple versus time.

5. The method of friction welding in which a voltage analog measurement is made of two of three parameters consisting of friction couple, speed and power absorbed by the parts being welding, making an electronic multiplication or division of the two measured parameters so as to determine the third parameter and comparing this third parameter derived from the measured parameters to a predetermined program value of the third parameter.

6. A method as in claim 5 in which the error between the parameter derived from the measured parameters and the preset value for the derived parameter is determined, compared with a preset error tolerance, and a signalling device is energized if the actual error exceeds the preset error tolerance value.

7. In a friction welding apparatus in which one of the parts to be welded is forced by a force producing device against and rotated with respect to a second piece part so as to transform frictional work into heat energy, the improvement comprising means for measuring the power absorbed by the parts to be welded, means for establishing a preset program of power with respect to time, means for producing voltage analogs of the aforesaid power program and the power absorbed by the work, means for comparing these analogs so as to produce a voltage which represents the error between the actual and the preset power, and means for controlling the force producing device so as to minimize the error.

8. In a friction welding apparatus as in claim 7, means for driving one of the work pieces in rotation, means for establishing a program of angular speed during the welding operation, means for measuring the angular speed of the rotating work and means for continuously comparing the preset speed program with the angular speed of the work piece so as to obtain a voltage which represents the difference or error between the programmed speed and the actual speed at each instant and means for controlling the speed of the aforesaid driving means so as to maintain the aforesaid speed error to a minimum.

9. In a friction welder as in claim 7 in which the means for measuring the power absorbed by the work pieces comprises means for obtaining a voltage analog which represents the friction couple between the work pieces, means for obtaining a voltage analog of the angular velocity of the work pieces, and electronic means for multiplying the first said voltage by the second so as to obtain a voltage representing the power absorbed by the work.

10. In a friction welder as in claim 7, means for programming the power and either the friction couple or the angular speed, means for measuring the friction couple and the angular speed, means for dividing the programmed instantaneous value of power with the instantaneous value for the second programmed value so as to obtain the instantaneous value for the third parameter, means for determining the difference between the measured value of the couple with the value for the couple as programmed or as derived from the electronic division of the programmed values, and servo controller means which acts to minimize the said difference.

References Cited

UNITED STATES PATENTS

| | | | |
|---|---|---|---|
| 3,516,591 | 6/1970 | Gage | 228—2 |
| 3,462,826 | 8/1969 | Farmer et al. | 29—470.3 |
| 3,455,494 | 7/1969 | Stamm | 228—2 |
| 3,417,457 | 12/1968 | Burke et al. | 29—470.3 |
| 3,380,641 | 4/1968 | Deemie et al. | 228—2 |
| 3,337,108 | 8/1967 | Taylor | 228—2 |
| 3,235,160 | 2/1966 | Walton | 228—2 |
| 3,234,644 | 2/1966 | Hollander | 29—470.3 |

OTHER REFERENCES

Hollander, M. B., C. J. Cheng and J. C. Wyman; Friction Welding Parameter Analysis, Welding Journal, November 1963.

Hasui, Atsushi, Sadao Fukushima and Junichi Kinagawa; Experimental Studies on Friction Welding Phenomena, Transactions of National Research Inst. & for Metals, vol. 10, No. 4 (1968).

JOHN F. CAMPBELL, Primary Examiner

R. J. CRAIG, Assistant Examiner

U.S. Cl. X.R.

156—73; 228—2, 8